United States Patent Office 3,538,015
Patented Nov. 3, 1970

3,538,015
LARGE PARTICLE SILICA SOLS AND METHOD OF PRODUCTION
Morris Mindick, Tyler, Tex., and Peter H. Vossos, Berwyn, Ill., assignors to Nalco Chemical Company, Chicago, Ill., a corporation of Delaware
No Drawing. Continuation-in-part of application Ser. No. 475,243, July 27, 1965. This application Dec. 7, 1967, Ser. No. 688,676
Int. Cl. C01b *33/14;* B01j *13/00*
U.S. Cl. 252—313                                 5 Claims

ABSTRACT OF THE DISCLOSURE

Composition and preparation of silica sols containing nonaggregated, uniform, substantially spherical particles having a weight-average particle diameter greater than 100 millimicrons. In order to obtain the desired uniformity of particle size in the finished product, it is necessary that the heel sol employed in the process have a certain uniformity, the preferred minimum uniformity index for the heel sol being about 0.7.

---

This application is a continuation-in-part of our copending application Ser. No. 475,243, filed July 27, 1965, now abandoned.

INTRODUCTION

This invention relates to large particle silica sols having a high degree of particle size uniformity and to a method of producing the sols. More particularly, the invention relates to silica sols containing nonaggregated, uniform, substantially spherical silica particles having a weight-average particle diameter greater than 100 millimicrons and to the manufacture thereof by accretion or growth on seed particles.

Silicia in the form of uniform colloidal dispersions in water and other hydrophilic liquids, commonly classified as silica sols, is well-known in the art. Particularly during the last decade, intensive research has been directed toward improvement of these silica sols and extension of the scope of uses to which they may be applied. Commercial and industrial demands are pressing for a stable siliceous product in the form of a uniform sol which has the additional quality of relatively high concentration of the active ingredient, silica. The benefits of supplying such a product in which the active ingredient, silica, is present in large amounts are obvious. For example, shipping and handling costs are reduced in direct proportion to the silica concentration of the product. In addition, many processes involving the use of such silica sol are effected at a considerable savings when such concentrated silica products are employed as starting reactants or modifiers.

While stability and relatively high concentration of silica are prime considerations in research directed toward the silica sol art, there is an additional growing demand for silica products having the aforementioned properties, which additionally contain silica particles of a relatively large particle size. In many processes the effectiveness is directly related to the particular size of the silica particles which must be uniformly and colloidally dispersed in the liquid hydrophilic carrier. For example when silica sols are used to delusterize various objects, the "flattening out" effect of the silica sol is a direct proportionate function of the average particle diameter of the silica contained therein. Many other processes call for the use of such large particle size silica in the form of sols, and recently efforts have been redoubled to achieve such large particle size silica sols.

It is evident to one skilled in the art that due to the inherent characteristics of silica, it is an extremely difficult task to produce silica sols which are stable over long periods of time, are concentrated sufficiently to meet practical demands, and yet, additionally, contain silica particles of sufficient size to meet the required high performance values of many treatment processes such as delusterizing and the like.

To some extent the problems of stability and concentration of silica sols have been overcome, although considerable time and efforts are still being directed toward these ends. Efforts, however, to produce relatively large silica particles existing in the form of a uniform sol which has the concurrent properties of stability and concentration have met with little or no success. It is important to many industries employing these sols that the silica particles be kept in a discrete state, that is, in the form of nonagglomerated, spherical particles. Only when the silica particles are in such a form are the free silanol groups on the surface of the particles completely free to react or perform some coactive function according to the particular use for which they are derived. When the properties of concentration, stability and large particle size are all desired in one product with the further proviso that the silica particles remain in a discrete, spherical, nonaggregated form, the problems attendant to the production of such sols are of considerable magnitude. Heretofore, no process is known to have been devised whereby stable, relatively concentrated silica sols containing large, spherical and discrete silica particles have been produced. Efforts toward this end usually result in dilute sols or silica sols which are unstable for the requisite practical amounts of time. Again, many of the same processes involving production of concentrated and/or stable silica products have the disadvantage that only a minor percentage of large silica particles are produced and results from the desired use are unsatisfactory. On the other hand, efforts to increase the silica particle size of known silica sols have only resulted in substantial agglomeration of the silica through silanol condensation-type reactions. These agglomerates of silica, as mentioned before, are often useless in many processes. These nonspherical or irregular agglomerates are joined by siloxane bonding and are not only undesirable because of size and irregularity, but also have the added disadvantage of low required activity in additive treatments. In short, while these agglomerated silica particles measure above say, 40 or 50 millimicrons as determined by supercentrifuging technique or some type of light refraction method, the ultimate size of the component silica particles is well below this range as determined from measurement in electron microscope photographs. These small particles have been merely joined into tight network by siloxane bonding to produce the aggregates thereof with the aforementioned deficiencies.

In the current work toward achievement of a concentrated stable silica sol containing silica of relatively large weight-average particle diameter, many of the prior art techniques were thoroughly investigated and subsequently discarded in view of their inadequacies with regard to all or several of the desired properties.

THE PRIOR ART

One of the earlier disclosed methods of building up the size of silica particles is discussed in Bechtold and Snyder, U.S. Pat. 2,574,902. Following the techniques outlined in this prior art disclosure, the following run was made: 40° Bé. commercial sodium silicate with a $SiO_2:Na_2O$ ratio of 3.25:1, containing 28% $SiO_2$, was diluted to about 4% of $SiO_2$ with deionized water and passed through a bed, 1¼ inch diameter x 15 in. of Nalcite, HCR, a sulfonated styrene divinylbenzene copolymer cation exchange resin in the hydrogen form which had been backwashed and well rinsed. Through this ion exchange technique the sodium silicate was converted to silicic acid or what is commonly known as active silica. 900 ml. of this acid sol with a pH of 2.9 measured with a Beckman Model G pH meter, glass electrode vs. calomel, calibrated against pH 7 buffer, were adjusted with 14 ml. of 1 N NaOH to give a sol with a $SiO_2:Na_2O$ ratio of 85:1 and a pH of 7.2. 425 ml. of this sol were charged to a 500 ml., 3-necked, round-bottomed flask equipped with stirrer, calibrated addition funnel, and vapor take-off with removable stopper for sample withdrawal from or material addition to the flask, and external heater.

This reaction flask was heated and refluxed under atmospheric pressure for 1 hour to form a heel. The alkalized sol was then fed into the reaction flask so as to maintain constant volume during removal of water by distillation. 300 ml. of 4% $SiO_2$ feed and 1900 ml. of 3.8% $SiO_2$ feed, all alkalized to a $SiO_2:Na_2O$ ratio of 85:1, were introduced over a period of 9½ hours, at which point the sol contained 36.5% $SiO_2$ at a pH of 9.33 with a viscosity of 14.3 centipoises as measured on a Brookfield Model LVF Viscometer. The sol so produced was turbid and hazy, with a turbidity index of 0.150 cm.$^{-1}$ at 10% $SiO_2$. The $SiO_2$ concentrations in the acid sol as well as in all other sol samples in this run and those runs described hereinafter, were determined from specific gravity measurements.

During the above run, 25 ml. samples for analyses were pipetted from the reaction flask after stopping the feed and continuing heat input for about 5 minutes to effect complete reaction of the active silica. Portions of these samples were titrated to determine specific surface area as described in Analytical Chemistry, vol. 29, p. 1981ff.

The number-average particle diameters were obtained from these specific surface area determinations by the relationship $D=3000/S$, where $D$ is the average particle diameter in millimicrons and $S$ is the specific surface area in m.$^2$/g. $SiO_2$. Constant volume was maintained in the reaction flask, by adjusting the feed rate between sample removals; a new volume was established after each sample removal so that particle concentration was not changed.

Table I describes the results of the various titrated samples withdrawn during the reaction at the various silica concentration levels in the heel. It must be noted that the maximum number-average silica particle diameter that was achieved is 12.7 millimicrons. While, of course, some silica particles occur as larger size particles throughout the colloidal particle range, the proportion of these as compared to the bulk of the silica particles is small.

The final sol product from the Bechtold and Snyder process was also measured to determine its maximum weight-average particle diameter by means of turbidity studies. The procedure used to measure the weight-average particle diameter was that outlined in Kolloid-Zeitschrift, vol. 173, No. 1, pages 38–48 (1960). These measurements were made with a Klett-Summerson Photoelectric Colorimeter using a 1.25 cm. cylindrical cell and a 400 m. filter. Using this technique the final sol product was found to have a maximum weight-average particle diameter of 24.4 millimicrons. In other words, whether speaking in terms of a number-average or a weight-average, the average particle diameter of these silica particles are well below 45 millimicrons in size. Further particle build-up was impossible due to gelation or precipitation of the solid silica particle phase.

TABLE I

| Ml. feed added | Time, hours | pH | Percent $SiO_2$ | Conc., g. $SiO_2$/ml. | D., m$\mu$ |
|---|---|---|---|---|---|
| 0 (Heel) | 0 | 8.14 | 4 | .041 | 5.3 |
| 300 | 1¼ | 8.50 | 7.8 | .082 | 7.4 |
| 850 | 3½ | 8.82 | 13.4 | .145 | 9.1 |
| 1,300 | 5½ | 9.01 | 19.5 | .219 | 10.9 |
| 1,900 | 8½ | 9.22 | 29.5 | .354 | 12.0 |
| 2,200 | 9½ | 9.33 | 36.5 | .463 | 12.7 |

While the sols produced by the Bechtold and Snyder method are sufficiently stable for practical periods of time, their inadequacies with regard to relatively low $SiO_2$ concentration and low average particle diameter are apparent.

Rule in U.S. Pat. 2,577,484, describes an improved method over Bechtold and Snyder silica particle build-up by again using a feed-heel technique. The following is a typical run made according to the Rule method. An acid sol of the type described above, with a pH of 2.8, was passed through Nalcite WBR (aminated styrene divinylbenzene copolymer weak base resin) in the free base form to give a deionized active silica with a pH of 3.25 containing 3.7% $SiO_2$. To 425 ml. of this sol was added 6.65 ml. of 1 N NaOH to produce an alkalized sol with a pH of 6.33 and a $SiO_2:Na_2O$ ratio of 150:1. This sol was then refluxed for 90 minutes. The pH of the resultant heel was 7.84 at 25° C. The heel was heated to boiling and the addition of deionized acid sol was started. Sufficient base was also added from time to time to maintain the $SiO_2:Na_2O$ ratio of 150:1. For each 200 ml. of feed added there was also added 1.2 ml. of 1 N NaOH. The feed and boil-off were continued for 11 hours, at which time the sol contained 31.8% $SiO_2$ at pH of 8.9 with a viscosity of 120 cps. After this time a scale-like precipitate had formed in the bottom of the flask indicating that further concentration was impossible. A total of 2700 ml. of feed and 16 ml. of 1 N NaOH were added. At appropriate intervals, test samples were withdrawn from the reaction. The finished sol was turbid and quite cloudy with a turbidity index of 0.211 cm.$^{-1}$ at 10% of $SiO_2$.

Table II below shows the physical characteristics of the various sol samples withdrawn during the specific run.

TABLE II

| Ml. feed in— | Time, hours | pH | Percent $SiO_2$ | Conc., g. $SiO_2$/ml. | D., m$\mu$ |
|---|---|---|---|---|---|
| 0 (Heel) | 0 | 7.84 | 3.6 | .037 | 4.7 |
| 300 | 1 | 8.12 | 7.3 | .076 | 6.6 |
| 400 | 3½ | 8.39 | 14.6 | .159 | 9.1 |
| 1,500 | 6¼ | 8.66 | 21.1 | .239 | 11.6 |
| 2,100 | 8¾ | 8.70 | 26.9 | .318 | 13.9 |
| 2,700 | 11 | 8.90 | 31.8 | .388 | 16.0 |

The weight-average particle diameter of the final sample as determined by the aforementioned turbidity technique was 31.3 millimicrons. The same inadequacies discussed above with regard to the Bechtold and Snyder process are also evident here. Again, the maximum average particle diameter that may be reached whether speaking in terms of a number or weight average is below 45 millimicrons. Even the most concentrated sol samples had an average particle diameter under this figure. Moreover, it was virtually impossible to concentrate the sol containing the largest particles at the end of the run, to a point much above 35% silica concentration. Toward the end of the experimental run substantial amounts of scale-like precipitate had formed and further concentration only resulted in increased silica precipitation out of the continuous liquid aqueous phase.

Another method of effecting silica particle build-up is revealed in Reuter et al. U.S. Pat. 2,929,790. The method disclosed therein was followed according to the following general procedure: Two liters of acid sol produced as described above were adjusted to a pH of 8.60 using the same commercial sodium silicate as was used in production of the acid sol. 1350 ml. of this alkalized sol with a $SiO_2$ content of 4.4% were charged to a 2 liter flask and evaporated at atmospheric pressure to 475 ml. This heel contained 12.6% $SiO_2$ at a pH of 10.3. 425 ml. of this heel were then charged to a reaction flask and brought to a boil while stirring vigorously. Addition of acid sol, containing 3.9% $SiO_2$ at a pH of 2.85 was started. During the addition of the remainder of the sol constant volume was maintained. 2400 ml. of feed were added during 10¼ hours at which point the sol contained 35.5% $SiO_2$. The finished sol had a pH of 9.02 and had a viscosity of 5.2 cps. The sol was turbid, but not cloudy with a turbidity index of 0.058 cm.$^{-1}$ at 10% $SiO_2$.

Physical data from the samples collected during this run is presented below in Table III.

TABLE III

| Ml. feed in— | Time, hours | pH | Percent SiO₂ | Conc., g. SiO₂/ml. | D., mµ |
|---|---|---|---|---|---|
| 0 (Heel) | 0 | 10.34 | 12.6 | .136 | 6.2 |
| 300 | 1¼ | 10.11 | 15.5 | .170 | 6.6 |
| 450 | 2 | 10.00 | 16.4 | .181 | 6.7 |
| 1,000 | 4¼ | 9.68 | 22.0 | .251 | 7.9 |
| 1,500 | 6¼ | 9.40 | 27.0 | .319 | 8.9 |
| 2,000 | 8¼ | 9.20 | 31.8 | .384 | 9.6 |
| 2,400 | 10¼ | 9.02 | 35.5 | .445 | 10.9 |

The weight-average particle diameter of the final concentrated product was also determined and found to be 17.4 mu.

As in the previous two experimental runs, this experiment also demonstrates that the achievement of a silica sol containing relatively large average diameter particles of silica was not available. As in the above discussed prior art disclosures, the products produced by this method may well contain silica particles having various diameters over a wide range of sizes. Again, however, whether a determination is made on the basis of a weight-average silica particle diameter or a numerical average thereof, results show that such an average diameter falls below 45 millimicrons in size.

Broge et al. U.S. Pat. 2,680,721 also describes a method of increasing the size of unaggregated silica particles. In this process the same type of acid sol as described above is alkalized, then pumped under high pressure through an extremely long stainless steel pipe immersed in a molten salt bath or some other type of appropriate container. The pressure in this process must be maintained at a relatively high level and the sol is heated at temperatures from 160–300° C. While large particle size colloidal silica is produced, the process has the inherent disadvantage that only relatively dilute concentrations of silica may be produced, for example, around 3% silica. Concentrated products above 35% silica content are unable to be synthesized using the method of this reference. Moreover, the expense of the process equipment involving high temperature and high pressure requirements, and the various steps involved make the process unattractive from this viewpoint. Thus, by following the method of Broge et al., the achievement of stable highly concentrated silica sol products has been sacrificed to achieve silica particles sizes in excess of 45 millimicrons.

Much work has been done by Alexander and Iler, with regard to determination of particle sizes in colloidal silica. In their article from the Journal of Physical Chemistry, volume 57, p. 932, they have slightly modified the Bechtold and Synder method described above for use in their investigation. By continuously withdrawing samples, 51 in all, during the run, the authors were able to analyze the fractions for particle size distribution using electron micrographs. While their work was done primarily to show the differences obtained between a determination of weight-average particle diameter, the number-average diameter and the surface average diameter, of silica particles the authors additionally prove that only in the final few fractions were relatively large silica particles produced. Most of the fractions showed that the vast percentage of particles were well below 45 milimicrons in size.

In the above cited work, Alexander and Iler show the addition of alkalized acid sol, containing 2.4% silica, to a commercially available alkaline sol containing approximately 30% silica. By a carefully controlled combination of continuous product removal and distillation of water, the silica content of the sol in their evaporator was maintained at 30%. As evidenced by analyses of several sample fractions removed during the experiment, the average diameter of the silica particles increased to a final value of about 60 millimicrons. During the experiment, no concentration of silica in the evaporator was achieved, and, indeed, it is very difficult to achieve concentrations much above 30% SiO₂ by the Bechtold and Snyder method without causing gelation of the silica or a drastic increase in the sol viscosity resulting in unusuable products. The removal from the evaporator of significant amounts of the product sol, as practiced by Alexander and Iler, would, of course, an unattractive process from an industrial viewpoint, as the yield of silica in the final product would be a small fraction of the total silica used in the process. Concentrated large particle silica sols above about 35% silica concentration could not be produced by a practice of this technique.

United States patent application Ser. No. 453,873 of William L. Albrecht, filed Apr. 26, 1965, now U.S. Pat. No. 3,440,170, discloses a silica sol containing nonaggregated, uniform, spherical silica particles having a weight-average particle diameter of about 45–100 millimicrons and a method of producing the sol. The sol is produced by providing an alkaline silica sol heel containing silica particles having a weight-average diameter of about 10–30 millimicrons, adding to the heel an acid silica sol feed containing silica having an average molecular weight less than 90,000 while evaporating solvent, the addition being carried out at a certain maximum feed rate, and maintaining the pH at a value of at least 7 during the addition.

The sol of the aforesaid application is stable over long periods of time, and the silica particles do not settle on centrifugation or on standing. The sols are manufactured and distributed in relatively high concentrations, e.g., 50% by weight, at which concentrations they do not gel. The sol has a variety of uses, including use as a textile delusterant, as an antislip agent, and as a modifier for elastomers and plastics.

OBJECTS OF THE INVENTION

It therefore becomes an object of the invention to produce concentrated stable silica sols having average particle diameters in excess of 100 millimicrons.

Another object is to produce these same stable concentrated large particle size silica sols by a simple single-step process.

A specific object of the invention is to produce silica sols having water as the continuous phase and containing 30–70% by weight of uniform, nonaggregated silica particles having a weight particle diameter in excess of 100 millimicrons.

A still further object is to produce concentrated stable silica sols containing large silica particles by the process of treating a silica sol in such a manner that the starting silica particles are uniformly increased in diameter to from 2.5–4.0 times the original diameter, such uniform build-up being effected according to a predetermined silica addition rate formula.

A still further object is to provide stable concentrated silica sols containing large, spherical, uniform, nonaggregated discrete silica particles with an average diameter of at least 100 millimicrons which have particular uses in such processes as delusterizing and the like.

Other objects will appear hereinafter.

THE INVENTION

The present invention provides a silica sol which is especially useful where large uniform spherical silica particles having a particle diameter greater than 100 millimicrons are desirable, such as in catalyst carriers or bases, and the sol is employed to advantage in the prior applications of silica sols. The new silica sol is very advantageous in that it is lacking in the gelling tendencies of the smaller particle size sols at very high concentrations, e.g., it is stable at a concentration of 70%. The new sol differs in kind from the piror sol of particle size from 45 to 100 millimicrons, in that the particles of the new sol may be caused to settle by standing or centrifugation. On the other hand, they may be maintained or replaced in suspension by incorporating a suspending agent and/or applying agitation.

The silica sol of the invention has a high uniformity index, which is defined as the quotient of the number-average particle diameter divided by the weight-average particle diameter. Such particle diameters are determined by the methods described by J. T. Bailey et al. in the Journal of Chemical Education, volume 39, page 196, April 1962. The uniformity index of the sol preferably is at least about 0.75 and more preferably at least 0.8. In the further preferred embodiments of the invention, illustrated in subsequent examples, the uniformity index is at least about 0.85. A uniformity index of 1 represents complete uniformity in particle size.

The preferred silica sols contain silica in high concentrations, about 30% to 70% by weight expressed as $SiO_2$, and have a pH of at least 7, preferably 7–11, and more preferably 8–11. Sols of such concentrations, especially the higher concentrations, are most advantageous for manufacture, shipment, and storage, and they are advantageous in various applications requiring a minimum of liquid or diluent.

The new silica sol is produced in accordance with the invention by accretion of silica on silica particles having a weight-average particle diameter of at least about 30 millimicrons. More particularly, the new sol is produced by providing a silica sol heel having a pH in the range of 7–11 and containing non-aggregated, substantially spherical silica particles having a weight-average particle diameter of at least about 30 millimicrons and a uniformity index of at least about 0.7, adding to the heel an acid silica sol feed containing silica having an average molecular weight less than 90,000 while maintaining the resulting mixture of a pH in the range of 7–11 and at a temperature of at least about 60° C., the addition of feed being made at a maximum rate as set forth hereinafter, and continuing the addition of feed under such conditions until the silica particles in the mixture have an increased weight-average particle diameter greater than 100 millimicrons.

The new method is simple, economical and reliable, and the desired silica sol having a weight-average particle diameter greater than 100 millimicrons and the desired uniformity is produced in a single step process. The sol may be produced initially in a concentration as high as 60–65% by weight of silica. The sol may be employed in the form and concentration in which it is produced, or it may be further concentrated by evaporation of the solvent. The uniform large particle sol may be blended with other silica sols, such as the products of the above-identified Albrecht application, to tailor the products for specific uses. In a further alternative, the sol of the invention may be dried to a solid product which is readily pulverized. Finely divided powders may be prepared in this manner, for use in applications requiring very small solid silica particles.

As described above, the new method commences with a silica sol heel containing nonaggregated substantially spherical silica particles having a weight-average particle diameter of at least about 30 millimicrons. In a preferred embodiment, a heel sol having an average particle diameter in the range of about 45–80 millimicrons is employed. As exemplified hereinafter, it is especially advantageous to employ a sol having an average particle diameter in the range of about 55–65 millimicrons. The heel sol may constitute a product made as described in the aforesaid Albrecht application, or it may constitute a further product therefrom according to the present invention.

In order to obtain the desired uniformity of particle size in the finished product, it is necessary that the heel sol have a certain uniformity. The preferred minimum uniformity index for the heel sol is about 0.7. It is further preferred that the heel sol index be at least 0.8. It has been found that in the course of production, there is a tendency of the particles toward increased uniformity, especially at the lower uniformity values. Consequently, the uniformity index of the heel sol may be lower than the index desired for the product, in certain cases. It is preferred that the heel sol index be not less than about 0.05 lower than the desired minimum index for the product. A silica sol having a uniformity index as desired for the heel sol is readily obtained by following the procedures of the said Albrecht application.

The pH of the heel hol is in the range of 7–11, and preferably, in the range of 8–11. The products of the Albrecht application fall within this range, and pH adjustments may be made by addition of alkali as described hereinafter and/or contacting with a suitable ion exchanger according to known methods. It is preferred that the electrolyte content of the heel sol, the reaction mixture, and the ultimate product be equivalent to less than 0.1 normal of a salt of a monovalent cation, based upon a composition having a silica content of 50% by weight, and it is further preferred that such electrolyte content be in the range of about 0.01 N to 0.1 N. The foregoing and all silica contents set forth herein are expressed as $SiO_2$.

The heel sol preferably contains at least 0.1%, and more preferably, at least 1% by weight of silica particles, in order to minimize the formation of new seed. It is further preferred to provide a heel sol having a concentration of about 1.0% to 30% by weight of silica particles, thereby providing for a relatively high feed addition rate that is attractive for commercial operation. As illustrated by the examples herein, a heel silica sol of a concentration of about 2.5% to 10% and containing silica particles of about 55–65 millimicrons is conveniently employed for producing desirable products in concentrations of about 30% to 35% by weight.

The heel sol particles are increased in size to provide the new product by the addition thereto of an acid silica sol feed such as described in the aforesaid Albrecht application. The feed sol contains silica having an average molecular weight less than 90,000. It is preferred that the molecular weight of the silica be in the range of about 1,000 to 46,000. The feed sol has a pH preferably in the range of 2–4, and further preferably in the range of 2.5–3.5. The feed sol preferably contains about 2% to 12%, and more preferably, 2% to 8% by weight of silica. The electrolyte content of the feed sol should be such as to maintain the electrolyte content within the above-described range.

As disclosed in the said Albrecht application, acid silica sols having the foregoing characteristics preferably are prepared according to the method disclosed in U.S. Pat. No. 2,244,325, by contacting an alkali metal silicate with a cation exchanger in the hydrogen form. Thus, for example, an aqueous sodium silicate solution is contacted with a cation exchange resin such as a sulfonated styrene divinylbenzene copolymer cation exchange resin, in the hydrogen form, to exchange the sodium of the silicate for hydrogen and thereby produce silicic acid or active silica. The acid silica sol is conveniently prepared in a concentration of about 2% to 8% by weight of silica, employing a starting silicate solution of corresponding concentration.

Water forms the continuous phase of the heel sol and of the feed sol in the preferred practice of the invention. It is also contemplated that hydrophilic organic liquids such as lower alkanols may be employed in the continuous phase.

The feed sol is added to the heel sol at a temperature of at least about 60° C. In the preferred practice of the invention, the heel sol is first brought to the reaction temperature, and then substantially continuous addition is commenced. It is preferred to operate at the boiling point of the mixture at atmospheric pressure, which is about 100° C. when water forms the continuous phase. Alternatively, the mixture may be heated under superatmospheric pressure or subatmospheric pressure.

The mixture is maintained at a pH in the range of 7;11, more preferably, 8–11. Gelation is likely to occur at a pH below 7. The pH is maintained by addition of a base that does not form an insoluble silicate, preferably an alkali metal hydroxide. An alkali metal silicate may be employed, in which case allowance is made in the rate calculations for the silica content thereof. It is preferred to adjust the pH by addition of alkali periodically during addition of the feed sol. Alternatively, sufficient alkali may be provided in the heel sol initially to provide the desired pH during the addition, in which case the pH preferably is adjusted initially to about 10–11.

It has been found that in order to produce a silica sol having the desired particle size uniformity index, the rate of addition of feed sol must be maintained within the limits of the rate equations set forth in the aforesaid Albrecht application. In particular, the maximum rate of addition of feed sol is defined by the equation $$F_t = kS_tC_t$$

where $F_t$ is the maximum feed rate at any time $t$ in grams of silica per milliliter of the reaction mixture per hour, $k$ is a predetermined rate constant, $S_t$ is the specific surface area of the silica particles in the mixture at time $t$ in square meters per gram of silica, and $C_t$ is the concentration of the silica particles in the mixture at time $t$ in grams The constant $k$ depends upon the reaction conditions, such as temperature and nature of the continuous phase or liquid carrier. The constant is empirically determined in a simple manner by conducting the accretion reaction at various addition rates in the desired manner and determining the number of new seed particles formed at the several rates. A marked increase in the number of small particles formed is observed at the transition from the maximum allowable rate to a higher rate. The constant may be calculated on the basis of the maximum rate thus determined. In this manner, it was determined that the value for $k$ is approximately 0.005 for a constant volume addition process employing water as the continuous phase and conducting the reaction at the boiling temperature of about 100° C. at atmospheric pressure.

The specific surface area, $S_t$, may be determined by titration, in the manner described in Analytical Chemistry, volume 28, page 1981 (1956). The silica concentration, $C_t$, may be determined from specific gravity measurements.

The addition of feed sol to heel sol is conducted while maintaining the reaction mixture at a constant volume in the preferred practice of the invention. The accretion reaction is conducted at the boiling temperature, and liquid is removed continuously by evaporation as addition proceeds. The rates of evaporation and addition are correlated with respect to each other while maintaining the addition rate within the maximum rate determined according to the above equation. As set forth in the aforesaid Albrecht application, the rate equation for the constant volume process then may be expressed in the following more convenient manner:

$$F_t = kS_0C_0^{1/3}C_t^{2/3}$$

where $F_t$, $k$, $C_t$ have the connotations described above, $S_0$ is the initial specific surface area of this silica particles in the heel soil in square meters per gram of silica, determined as described above, and $C_0$ is the initial concentration of the silica particles in the heel sol in grams of silica per milliliter. In the event that the pH of the mixture is adjusted with an alkaline silicate, the silica content thereof is included in the concentration values. The surface area is determined after allowing any added silicate time to react with the silica particles present, or allowance for the additional silica is otherwise made.

Addition of the feed sol to the mixture is continued under the said conditions of pH, temperature, and concentration to maintain constant volume, until the silica particles in the mixture have an increased weight-average particle diameter greater then 100 millimicrons. The particle size may be determined periodically as the accretion progresses, conveniently by examinations with an electron microscope made at intervals during the run. A good approximation of the particle size may be made in the constant volume process on the basis of the silica concentration in the mixture, as described in the aforesaid Albrecht application. Thus, in the ideal process, the relationship between particle size and concentration is represented by the following equation:

$$d_t = \frac{d_0 C_t^{1/3}}{C_0^{1/3}} = d_0 \left(\frac{C_t}{C_0}\right)^{1/3}$$

where $d_t$ is the diameter of the silica particles at any time $t$, is expressed in millimicrons, $d_0$ is the initial diameter of silica particles in the heel sol, expresed in millimcrons, and $C_t$ and $C_0$ have the connotatons described above.

The foregoing equation advantageously is used to produce a sol having both a desired particle size and a desired concentration. Thus, for example, by substituting the desired values for the final particle size and final concentration, and the size of the particles in the heel sol, the concentration, $C_0$, which is required for the heel sol may be determined.

Silica particles greater than 100 millimicrons in diameter may be produced up to a maximum silica concentration of approximately 65% by weight without gelation. At the lower end of the particle size range, it is preferred to maintain the concentration below about 63%. However, the products thus produced may be concentrated further, to at least 70% by weight of silica, without gelation.

The examples which follow illustrate conditions for the production of silica particles having a weight-average particle diameter in the range of about 110–160 millimicrons at silica concentrations of about 30% to 35% by weight. Products of greater particle size and/or concentration are produced similarly under the conditions described above. The particles may be increased in diameter up to four times their initial diameter, and the production of particles up to 400 millimicrons in diameter or greater is contemplated. In producing the larger particles, it may be advantageous to incorporate in the mixture, especially during storage, a suspending agent, such as bentonite clay. The silica particles are nonaggregated or discrete, dense, amorphous, and substantially spherical, and they have a high degree of uniformity. The silica sol product has a pH of 7–11, preferably 8–11, a viscosity of 2–500 cps. and a conductivity of 1,000–10,000 micromhos/cm. at 25° C. Where the continuous phase is water, it may be replaced by a hydrophilic liquid according to known techniques employed with silica sols.

EXAMPLES

The following examples are illustrative of the invention. It will be understood that the invention is not limited to the examples nor to the conditions, proportions, materials and procedures set forth therein. In the examples, the silica proportions are by weight.

Example 1

An aqueous alkaline silica sol heel was prepared from a sol produced as described in the aforesaid Albrecht application. The said product contained 50% of nonaggregated, substantially spherical silica particles having a weight-average particle diameter of 63.8 millimicrons and a number-average particle diameter of 54.2 millimicrons, the particles thus having a uniformity index of 0.85. The pH of the product was 8.6. The heel sol was prepared by diluting the product with deionized water to a concentration of 5% $SiO_2$. The pH of the heel sol was adjusted to 10.7 with 1 N sodium hydroxide. A 4-liter quantity of heel sol was charged to a 5-liter, three-necked flask equipped with a stirrer, calibrated addition funnels, a water-cooled condenser and distillate receiver, and a variable resistance electrical heater. An acid silica sol was produced by contacting sodium silicate with a cation exchanger in the hydrogen form, according to the method of U.S. Pat. No. 2,244,325. An aqueous sodium silicate solution containing 7.8% of sodium silicate, corresponding to 6.0% $SiO_2$, was prepred with soft water. The solution was passed through a column of sulfonated styrene divinylbenzene copolymer cation exchanger resin as described in U.S. Pat. No. 2,366,007 (Nalcite HCR). The acid silica sol product of ion exchange had a pH of 2.7 and contained 5.3% $SiO_2$. The average molecular weight of the silica was less than 60,000. The acid sol was employed as the initial feed sol.

The maximum initial feed rate calculated according to the rate equation, $F_t = kS_0 C_0^{1/3} C_t^{2/3}$, when converted into volume of feed sol, was 0.25 pot-volumes per hour (i.e., one-fourth of the volume of the flask contents or 1 liter per hour). The maximum feed rate increased with the concentration of the reaction mixture, according to the rate equation.

The heel sol was heated in the flask under atmospheric pressure to the boiling temperature and the feed sol then was added to the flask dropwise. Addition of the feed sol was commenced at a rate of 0.062 pot-volumes per hour, i.e., one-fourth of the initial maximum rate. The addition rate was maintained constant for 3 hours and then increased to 0.125 pot-volumes per hour. This rate was maintained for 12 hours, when it was increased to 0.25 pot-volumes per hour. The rate was maintained constant thereafter until the run was complete, in 38 hours. All rates were below the maximums according to the rate equation.

The rate of boiling was adjusted during the addition to maintain the amount of distillate equal to the amount of feed sol being added, thereby maintaining the volume of the mixture constant. 2250 milliliters of the initial feed sol were added, at which point the pH of the mixture was 10. The pH was adjusted to 10.5 with 1 N sodium hydroxide. Additional quantities of feed sol which had been freshly prepared similarly to the preparation of the initial feed sol were added thereafter, and the pH was maintained between about 10 and 10.5 by periodic additions of sodium hydroxide in like manner. The additional quantities of feed sol were in order: 3500 ml. at 4.7% $SiO_2$ and pH 2.85; 4000 ml. at 5.4% $SiO_2$ and pH 2.9; 6000 ml. at 4.5% $SiO_2$ and pH 2.8; 3000 ml. at 5.2% $SiO_2$ and pH 2.75; and 7520 ml. at 5.2% $SiO_2$ and pH 2.8.

The silica sol product thus prepared contained non-aggregated substantially spherical silica particles having a weight-average particle diameter of 119 and a number-average particle diameter of 101, for a uniformity index of 0.85. The sol contained 32% $SiO_2$, had a pH of 9.7, and an electrolyte content of about 0.12% as NaCl.

The silica sol product was evaporated to dryness below 50° C. in vacuo. The dried product was easily pulverized with the fingers, and it could be ground to a fine powder in a colloid mill.

Example 2

A silica sol heel of 10% $SiO_2$ concentration and pH 10 was prepared from a product produced as described in the aforesaid Albrecht application. The product contained particles having a weight-average diameter of 58.5 millimicrons and a number-average diameter of 47.2 millimicrons, for a uniformity index of 0.81. Quantities of acid silica sol feed were prepared in the manner described in Example 1, at concentrations of 4.5–5% $SiO_2$ and a pH of about 2.7–2.8. According to the aforesaid rate equation, the maximum initial feed rate was 0.5 pot-volume per hour (based on a silica concentration in the feed sol of 5.0%).

One liter of the heel sol was charged to a flask equipped as described in Example 1. The heel sol was heated to boiling, and feed sol was added dropwise to the flask at one-half of the calculated maximum feed rate. This rate was maintained throughout the entire run, totaling 22 hours. The run was conducted at a constant volume, and the pH was maintained in the range of 8.5 to 10 by periodic additions of 1 N sodium hydroxide, as described in Example 1.

The silica sol product contained nonaggregated, spherical silica particles having a weight-average particle diameter of 112 and a number-average particle diameter of 97, for a uniformity index of 0.86. It will be observed that in the process the uniformity index increased from 0.81 to 0.86 in the heel sol. The product contained 33.5% $SiO_2$ and had a pH of 8.7.

Example 3

An alkaline silica sol containing uniform particles having a weight-average particle diameter of about 160 millimicrons in a concentration of 35% $SiO_2$ may be produced in the manner described in Examples 1 and 2, commencing with a heel sol containing silica particles having a weight-average particle diameter of about 60 millimicrons in a concentration of 2.5% $SiO_2$. Silica sol feed containing 4.5% $SiO_2$ and having a pH of 2.7 is employed. The pH of the reaction mixture is maintained between 8 and 10, and addition is made while heating the reaction mixture to boiling and evaporating water to maintain a constant volume. The feed rate is maintained within the limits of the rate equation set forth in Example 1.

When the aforesaid rate equation is exceeded, the silica particles in the product are not uniform but include a wide range of diameters. This result was illustrated by a run in which the maximum rate was exceeded for part of the run.

A heel sol containing 2.5% $SiO_2$ was prepared at pH 9.5. The silica particles in the sol had a weight-average particle diameter of 58.5 millimicrons and a number-average particle diameter of 47.2 millimicrons, for a uniformity index of 0.81. A feed sol containing 4.5% $SiO_2$ at pH 2.7 was prepared. The feed sol was added to the heel sol at the boiling temperature under atmospheric pressure while maintaining constant volume, in the manner of Example 2. The reaction mixture was maintained at pH 8–10 during the run, by additions of 1 N sodium hydroxide.

The maximum initial feed rate calculated from the rate equation was 0.1 pot-volumes per hour. This rate was maintained for the first 5 hours of addition. At this time, the rate was increased to 0.19 pot-volumes per hour, whereas the calculated maximum feed rate was 0.16 pot-volumes per hour. Thereafter, the feed rate was gradually increased to 0.4 pot-volumes per hour at the end of 25 hours of addition. At this time, the calculated maximum allowable feed rate was 0.7 pot-volumes per hour. The feed rate of 0.4 pot-volumes per hour was maintained until the end of the run, after 33 hours addition. Electron micrographs taken at the end of 5 hours of addition exhibited only growth of the initial silica particles, with no new particles being evident. Electron micrographs taken 7 hours later, after the maximum feed rate had been exceeded, exhibited numerous small particles less than 10 millimicrons in diameter. Electron micrographs taken subsequently exhibited no additional small particles.

The product contained 33% $SiO_2$ at a pH of 8.5. The weight-average particle diameter was 137, and the number-average particle diameter was 91, for a uniformity index of 0.66. Electron micrographs of the product showed that about one-half of the particles were greater than 100 millimicrons and about one-half of the particles were less than 60 millimicrons. There were numerous particles in the range of 140–160 millimicrons. Thus, while large particles were formed, in the range of 100 to 160 millimicrons, the sol was nonuniform. The nonuniformity occurred with the formation of new seed particles when the maximum feed rate was exceeded.

The product upon standing for several months or centrifuging for 3½ hours at 2200 r.p.m. separated into four layers increasing in particle diameter from top to bottom. Electron micrographs showed the first layer to be a very dilute sol with particles 20–40 millimicrons in diameter.

The second layer contained particles 40–60 millimicrons in diameter. The third layer contained a majority of particles 120–160 millimicrons in diameter. The fourth layer contained particles 140–160 millimicrons in diameter. In contrast, the products of Examples 1 and 2 separated into only two layers on standing several months, the upper layer being an essentially sol-free water, and the lower layer containing all of the large silica particles, which settled.

The difference in the nature of the respective products is indicated by the differences observed upon standing or centrifugation. The nonuniform product of this example is comparatively heterogeneous with the particle diameters extending over a wide range, and it is not adapted for use where uniformly large particles greater than 100 millimicrons in diameter are desired. On the other hand, the products of Examples 1 and 2 are composed of particles greater than 100 millimicrons in diameter with a high degree of uniformity.

CONCLUSION

The invention thus provides a silica sol containing nonaggregated, substantially spherical silica particles having a particle diameter greater than 100 millimicrons and a high degree of uniformity. A stable sol is provided at a high concentration well adapted for various uses and for shipment and storage. The sol may be dried for making fine silica powder. The invention also provides a simple, effective, and reliable method for producing the sol which is well adapted for commercial manufacture.

While certain preferred embodiments of the invention have been described, it will be apparent that various changes and modifications may be made in the method and other specific products may be manufactured in like manner, within the spirit and scope of the invention. It is intended that such changes, modifications, and variations be included within the scope of the appended claims.

We claim:

1. The method of producing an aqueous silica sol containing nonaggregated, uniform, substantially spherical silica particles having a weight-average particle diameter greater than 100 millimicrons, which comprises providing an aqueous silica sol heel having a pH in the range of 7–11 and containing at least 0.1% by weight of nonaggregated, substantially spherical silica particles having a weight-average particle diameter of at least about 30 millimicrons and a uniformity index of at least about 0.7, adding to said heel an aqueous acid silica sol feed containing silica having an average molecular weight less than 90,000 while maintaining the resulting mixture at a pH in the range of 7–11 and at a temperature of at least about 60° C., said addition of feed being made at a maximum rate according to the equation $$F_t = k S_t C_t$$

where $F_t$ is the maximum feed rate at any time $t$ in grams of silica per milliliter of said mixture per hour, $k$ is a predetermined rate constant, $S_t$ is the specific surface area of the silica particles in said mixture at the time $t$ in square meters per gram of silica, and $C_t$ is the concentration of the silica particles in said mixture at time $t$ in grams of silica per milliliter, and continuing said addition of feed under said conditions until the silica particles in said mixture have an increased weight-average particle diameter greater than 100 millimicrons, all quantities of silica being expressed as $SiO_2$.

2. The method of producing an aqueous silica sol containing nonaggregated, uniform, substantially spherical silica particles having a weight-average particle diameter greater than 100 millimicrons which comprises providing an aqueous silica sol heel having a pH in the range of 7–11 and containing at least 0.1% by weight of nonaggregated, substantially spherical silica particles having a weight-average particle diameter of at least about 45 millimicrons and a uniformity index of at least about 0.7, adding to said heel an aqueous acid silica sol feed containing silica having an average molecular weight less than 90,000 while maintaining the resulting mixture at a pH in the range of 7–11 and at a temperature of at least about 60° C. and while concentrating the resulting mixture to maintain it at a substantially constant volume, said addition of feed being made at a maximum rate according to the equation $$F_t = k S_0 C_0^{1/3} C_t^{2/3}$$

where $F_t$ is the maximum feed rate at any time $t$ in grams of silica per milliliter of said mixture per hour, $k$ is a predetermined rate constant, $S_0$ is the initial specific surface area of the silica particles in said heel in square meters per gram of silica, $C_0$ is the initial concentration of the silica particles in said heel in grams of silica per milliliter, and $C_t$ is the concentration of the silica particles in said mixture at time $t$ in grams of silica per milliliter, and continuing said addition of feed under said conditions until the silica particles in said mixture have an increased weight-average particle diameter greater than 100 millimicrons, all quantities of silica being expressed as $SiO_2$.

3. The method of producing an aqueous silica sol containing nonaggregated, uniform, substantially spherical silica particles having a weight-average particle diameter greater than 100 millimicrons, which comprises providing an aqueous silica sol heel having a pH in the range of 7–11 and containing about 1.0% to 30% by weight of nonaggregated, substantially spherical particles having a weight-average particle diameter in the range of about 45–80 millimicrons and a uniformity index of at least about 0.7, adding to said heel an aqueous acid silica sol feed containing silica having an average molecular weight less than 90,000 while maintaining the resulting mixture at a pH in the range of 7–11 and at its boiling temperature under atmospheric pressure and while evaporating water from the resulting mixture to maintain it at a substantially constant volume, said addition of feed being made at a maximum rate according to the equation $$F_t = 0.005 S_0 C_0^{1/3} C_t^{2/3}$$

where $F_t$ is the maximum feed rate at any time $t$ in grams of silica per milliliter of said mixture per hour, $S_0$ is the initial specific surface area of the silica particles in said heel in square meters per gram of silica, $C_0$ is the initial concentration of the silica particles in said heel in grams of silica per milliliter, and $C_t$ is the concentration of the silica particles in said mixture at time $t$ in grams of silica per milliliter, and continuing said addition of feed under said conditions until the silica particles in said mixture have a weight-average particle diameter greater than 100 millimicrons, all quantities of silica being expressed as $SiO_2$.

4. The method of producing an aqueous silica sol containing nonaggregated, substantially spherical silica particles having a weight-average particle diameter greater than 100 millimicrons, which comprises providing an aqueous silica sol heel having a pH in the range of 7–11 and containing about 1.0% to 30% by weight of nonaggregated, substantially spherical particles having a weight-average particle diameter in the range of about 45–80 millimicrons and a uniformity index of at least about 0.7, adding to said heel an aqueous silica sol feed having a pH in the range of 2–4 and containing about 2% to 12% by weight of silica having an average molecular weight less than 90,000, maintaining the resulting mixture at a pH in the range of 7–11 and at its boiling temperature under atmospheric pressure and evaporating water from the resulting mixture to maintain it at a substantially constant volume during said addition of feed, said addition of feed being made at a maximum rate according to the equation $$F_t = 0.005 S_0 C_0^{1/3} C_t^{2/3}$$

where $F_t$ is the maximum feed rate at any time $t$ in grams of silica per milliliter of said mixture per hour, $S_0$ is the initial specific surface area of the silica particles in said heel in square meters per gram of silica, $C_0$ is the initial concentration of the silica particles in said heel in grams of silica per milliliter, and $C_t$ is the concentration of the silica particles in said mixture at time $t$ in grams of silica per milliliter and continuing said addition of feed under said conditions until the silica particles in said mixture have a weight-average particle diameter greater than 100 millimicrons and up to a maximum silica concentration of about 65% by weight, all quantities of silica being expressed as $SiO_2$.

5. The method of producing an aqueous silica sol containing nonaggregated, substantially spherical silica particles having a weight-average particle diameter greater than 100 millimicrons and a uniformity index of at least about 0.85, which comprises providing an aqueous silica sol heel having a pH in the range of about 8–11 and containing about 2.5% to 10% by weight of nonaggregated, substantially spherical particles having a weight-average particle diameter in the range of about 55–65 millimicrons and a uniformity index of at least about 0.8, adding to said heel an aqueous silica sol feed having a pH in the range of about 2.5–3.5 and containing about 2% to 8% by weight of silica having an average molecular weight in the range of about 1,000 to 46,000, said feed comprising the product of contacting an alkali metal silicate with a cation exchanger in the hydrogen form, maintaining the resulting mixture at a pH in the range of 8–11 and at its boiling temperature under atmospheric pressure and evaporating water from the resulting mixture to maintain it at a substantially constant volume during said addition of feed, said addition of feed being made at a maximum rate according to the equation $$F_t = 0.005 S_0 C_0^{1/3} C_t^{2/3}$$

where $F_t$ is the maximum feed rate at any time $t$ in grams of silica per milliliter of said mixture per hour, $S_0$ is the initial specific surface area of the silica particles in said heel in square meters per gram of silica, $C_0$ is the initial concentration of the silica particles in said heel in grams of silica per milliliter, and $C_t$ is the concentration of the silica particles in said mixture at time $t$ in grams of silica per milliliter and continuing said addition of feed under said conditions until the silica particles in said mixture have a weight-average particle diameter in the range of about 110–160 millimicrons and the silica concentration is about 30% to 35% by weight, all quantities of silica being expressed as $SiO_2$.

References Cited
UNITED STATES PATENTS 2,577,485  12/1951  Rule.
2,929,790  3/1960   Reuter et al.

RICHARD D. LOVERING, Primary Examiner

U.S. Cl. X.R.

23—182; 106—36, 286; 252—8.6, 309, 449

PO-1050
(5/69)

UNITED STATES PATENT OFFICE
CERTIFICATE OF CORRECTION

Patent No. 3,538,015                  Dated November 3, 1970

Inventor(s) Morris Mindick et al

It is certified that error appears in the above-identified patent and that said Letters Patent are hereby corrected as shown below:

Column 1, line 38, "Silicia" should read -- Silica --.

Column 2, line 69, "Nalcite," should read -- Nalcite --.

Column 3, Table I, "Porcent" should read -- Percent --.

Column 6, line 6, "course, an" should read -- course, be an --; line 70, "piror" should read -- prior --.

Column 11, line 3, "prepred" should read -- prepared --.

SIGNED AND
SEALED
JAN 5 1971

(SEAL)
Attest:

Edward M. Fletcher, Jr.
Attesting Officer

WILLIAM E. SCHUYLER, JR.
Commissioner of Patents